US010332243B2

(12) United States Patent
Berge et al.

(10) Patent No.: US 10,332,243 B2
(45) Date of Patent: Jun. 25, 2019

(54) TAMPERING DETECTION FOR DIGITAL IMAGES

(71) Applicant: International Business Machines Corporation, Armonk, NY (US)

(72) Inventors: Layne A. Berge, Rochester, MN (US); John R. Dangler, Rochester, MN (US); Matthew S. Doyle, Chatfield, MN (US); Thomas W. Liang, Rochester, MN (US); Manuel Orozco, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/376,314

(22) Filed: Dec. 12, 2016

(65) Prior Publication Data
US 2018/0165835 A1 Jun. 14, 2018

(51) Int. Cl.
*G06T 7/00* (2017.01)
*H04N 1/32* (2006.01)

(52) U.S. Cl.
CPC ....... *G06T 7/0002* (2013.01); *H04N 1/32144* (2013.01); *G06T 2207/10004* (2013.01); *G06T 2207/10016* (2013.01)

(58) Field of Classification Search
CPC ............ G06T 7/0002; G06T 7/97; G06T 2207/20024; G06T 2207/10016; G06T 2201/0065; G06T 1/005; G06T 1/0028; G06T 1/0064; G06T 1/0085;
(Continued)

(56) References Cited

U.S. PATENT DOCUMENTS 6,154,519 A * 11/2000 Florent ................. G06T 5/50
378/62
7,720,249 B2 * 5/2010 Rhoads ............ G06F 17/30876
348/460

(Continued)

FOREIGN PATENT DOCUMENTS

CN 103164856 A 6/2013

OTHER PUBLICATIONS

"Determining Image Origin and Integrity Using Sensor Noise."; IEEE Transactions on Information Forensics and Security IEEE Trans.Inform.Forensic Secur. Information Forensics and Security, IEEE Transactions on. 3(1):74-90 Mar. 2008.; Chen, M., Fridrich, J., Goljan, M., Lukas, J..*

(Continued)

*Primary Examiner* — Michael S Osinski
(74) *Attorney, Agent, or Firm* — Patterson + Sheridan, LLP

(57) ABSTRACT

A computing system for tampering detection for digital images is disclosed. The computing system uses a LTI filter to filter time series data representing images in one or both of two videos and/or a still image of a live photo captured by a camera. A causal relationship in time existed between the images in the two videos and the still image when they were captured by the camera. The computing system determines whether the filtered output data representing an image by using the LTI filter is causal. If the computing system determines that the filtered output data representing the image is non-causal, it asserts a signal indicating that the image has been modified after it was captured.

20 Claims, 5 Drawing Sheets

(58) Field of Classification Search
CPC ........... H04N 1/32144; H04N 1/32352; H04N 2201/3233; H04N 5/357; G06K 2009/00583
See application file for complete search history.

(56) References Cited

U.S. PATENT DOCUMENTS

| | | | | |
|---|---|---|---|---|
| 8,160,293 | B1* | 4/2012 | Fridrich | G06K 9/00899 |
| | | | | 382/100 |
| 8,184,850 | B2* | 5/2012 | Shi | G06K 9/527 |
| | | | | 382/100 |
| 8,928,813 | B2* | 1/2015 | Liu | H04N 5/213 |
| | | | | 348/609 |
| 8,983,115 | B2* | 3/2015 | Kawazu | G06T 1/0028 |
| | | | | 382/100 |
| 9,007,467 | B2* | 4/2015 | Nagel | H04N 7/183 |
| | | | | 348/192 |
| 9,087,228 | B2 | 7/2015 | Ivanov et al. | |
| 9,230,166 | B2* | 1/2016 | Lee | G06K 9/00624 |
| 9,336,556 | B2* | 5/2016 | Kawazu | G06T 1/0028 |
| 9,799,376 | B2* | 10/2017 | Wang | G11B 27/105 |
| 9,838,643 | B1* | 12/2017 | Madhav | H04N 5/911 |
| 2002/0009208 | A1* | 1/2002 | Alattar | G06F 17/30876 |
| | | | | 382/100 |
| 2003/0169456 | A1* | 9/2003 | Suzaki | G06T 1/0028 |
| | | | | 358/3.28 |
| 2005/0117775 | A1* | 6/2005 | Wendt | G06T 1/005 |
| | | | | 382/100 |
| 2006/0020830 | A1* | 1/2006 | Roberts | G06T 1/0042 |
| | | | | 713/194 |
| 2008/0285655 | A1* | 11/2008 | Au | H04N 19/577 |
| | | | | 375/240.16 |
| 2008/0285796 | A1* | 11/2008 | Wendt | G06T 1/0064 |
| | | | | 382/100 |
| 2009/0110078 | A1* | 4/2009 | Crinon | H04N 5/21 |
| | | | | 375/240.24 |
| 2009/0322787 | A1* | 12/2009 | Yang | H04N 5/23248 |
| | | | | 345/630 |
| 2010/0037059 | A1* | 2/2010 | Sun | G06T 1/005 |
| | | | | 713/176 |
| 2011/0080525 | A1* | 4/2011 | Bock | H04N 19/53 |
| | | | | 348/699 |
| 2012/0230536 | A1* | 9/2012 | Fridrich | G06K 9/00899 |
| | | | | 382/100 |
| 2013/0113953 | A1* | 5/2013 | Nagel | H04N 7/183 |
| | | | | 348/222.1 |
| 2013/0208941 | A1* | 8/2013 | Liu | G06T 1/0021 |
| | | | | 382/100 |
| 2014/0105498 | A1* | 4/2014 | Sethuraman | G06T 7/20 |
| | | | | 382/180 |
| 2015/0139607 | A1* | 5/2015 | Grunberg | H04N 5/217 |
| | | | | 386/230 |
| 2016/0086312 | A1* | 3/2016 | Shimizu | H04N 7/012 |
| | | | | 382/299 |
| 2016/0092561 | A1* | 3/2016 | Liu | G06F 16/739 |
| | | | | 386/230 |
| 2016/0132985 | A1 | 5/2016 | Liu | |
| 2016/0253789 | A1* | 9/2016 | Chen | G06T 5/002 |
| | | | | 348/241 |
| 2016/0364609 | A1* | 12/2016 | Ivanisov | G06K 9/00604 |
| 2018/0026789 | A1* | 1/2018 | Qiu | H04L 9/3226 |
| 2018/0033120 | A1* | 2/2018 | Wang | G06T 11/60 |

OTHER PUBLICATIONS

Hsu, Chih-Chung, et al., "Video Forgery Detection Using Correlation of Noise Residue," 2008 IEEE 10th Workshop on Multimedia Signal Processing, IEEE, 2008.

Swaminathan et al., "Digital Image Forensics via Intrinsic Fingerprints," IEEE Trans on Information Forensics and Security, v3, n1, pp. 101-117, Mar. 2008, IEEE.

Lukáš et al., "Detecting Digital Image Forgeries Using Sensor Pattern Noise," Electronic Imaging 2006, Int'l Soc for Optics and Photonics, 2006.

* cited by examiner

TAMPERING DETECTION FOR DIGITAL IMAGES

BACKGROUND

The present disclosure relates to tampering detection for digital images, and more specifically, to tampering detection for digital images by using linear time invariant (LTI) filtering.

Digital images are widely considered as a valuable form for expression. However, data of digital images can be modified. Unauthorized modifications to data of digital images, e.g., tampering, harm the authenticity of the digital images. After a digital image is captured by a camera, a person can modify the digital image easily in a variety of ways. For example, the person can modify the digital image by adding or removing objects in the digital image or swapping out faces of persons in the digital image and so on by using software programs. Business organizations, educational institutions, or news providers may want to confirm that a digital image is in its original form—i.e., was not modified or tampered with—before using the digital image in a publication or news report. Publishing an altered digital image may convey false or misleading information which can harm the reputation of the publisher.

SUMMARY

One embodiment of the present disclosure provides a system. The system includes a processor and a memory. The memory contains a program that, when executed on the processor, performs an operation. The operation includes filtering time series data using a linear time-invariant digital filter. The time series data represents at least one first image and a second image captured by a camera. The at least one first image was captured by the camera before the second image was captured. A causal relationship in time existed between the at least one first image and the second image when the first and second images were captured. The operation also includes upon determining that output data representing the second image generated by the linear time-invariant digital filter is non-causal, asserting a signal indicating that the second image has been modified after the image was captured by the camera.

One embodiment of the present disclosure provides a computer program product. The computer program product includes a non-transitory computer-readable storage medium having computer readable program code embodied therewith. The computer readable program code filters time series data using a linear time-invariant digital filter. The time series data represents at least one first image and a second image captured by a camera. The at least one first image was captured by the camera before the second image was captured. A causal relationship in time existed between the at least one first image and the second image when the first and second images were captured. Upon determining that output data representing the second image generated by the linear time-invariant digital filter is non-causal, the computer readable program code asserts a signal indicating that the second image has been modified after the image was captured by the camera.

One embodiment of the present disclosure provides a method. The method includes filtering time series data using a linear time-invariant digital filter. The time series data represents at least one first image and a second image captured by a camera. The at least one first image was captured by the camera before the second image was captured. A causal relationship in time existed between the at least one first image and the second image when the first and second images were captured. The method also includes upon determining that output data representing the second image generated by the linear time-invariant digital filter is non-causal, asserting a signal indicating that the second image has been modified after the image was captured by the camera.

DETAILED DESCRIPTION

Figure 1:
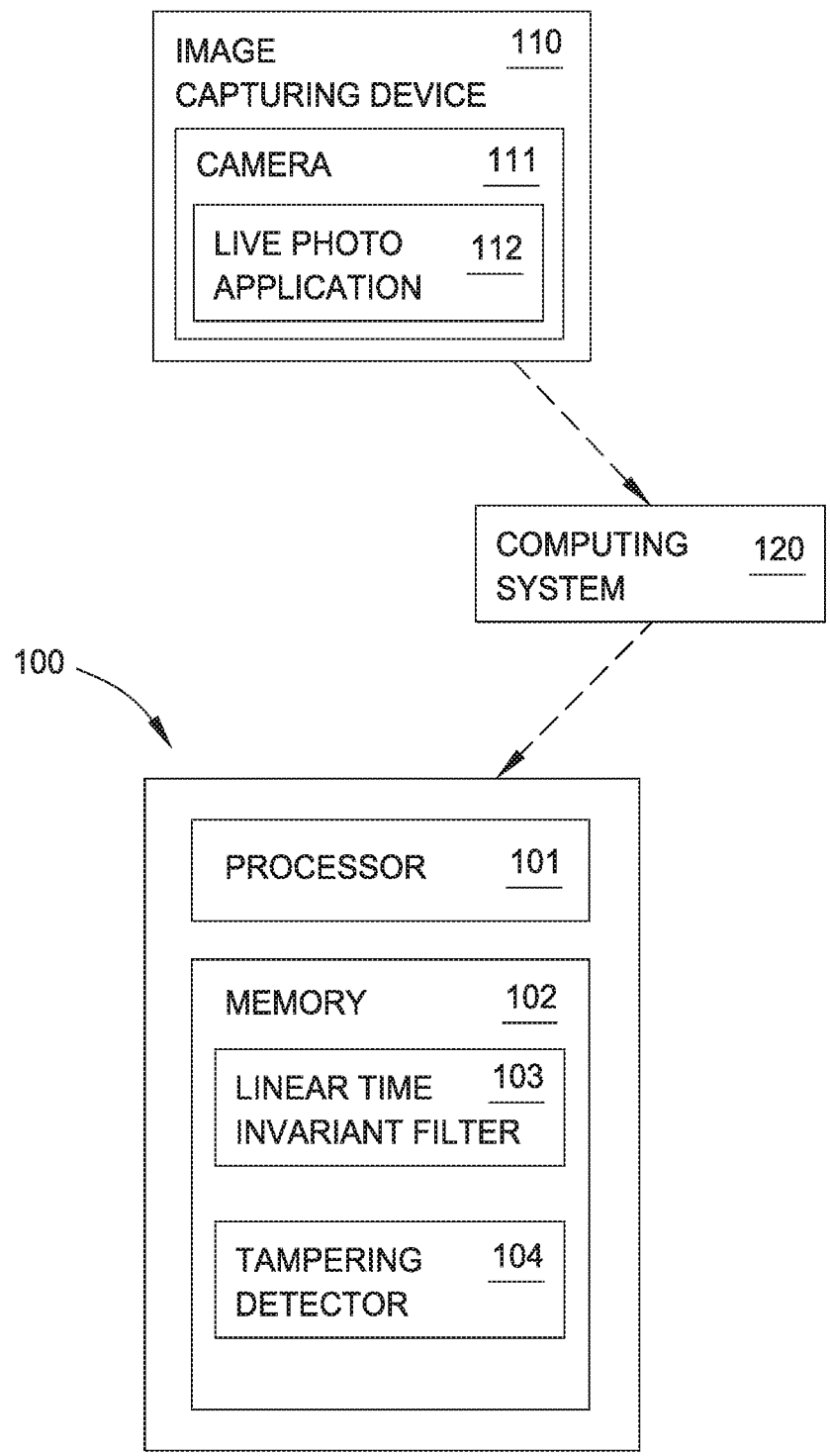
FIG. 1 illustrates a computing system, according to one embodiment herein.

Modern cell phones can capture a "live photo". A live photo can bring the photo to life by capturing, e.g., a few seconds of video when users are taking a photo by using a camera on their modern cell phones. When capturing a live photo, rather than freezing a moment in time with a still photo, an image device captures short videos before and after the user takes the photo, with movement and sound. For example, the image device may capture 1.5 seconds of video and audio both before and after the user presses the shutter button to take a photo to generate the live photo. So in addition to capturing a still digital image (i.e., a single image), a live photo also includes two 1.5-second videos.

The images in the two videos and the still image have a causal relationship in time when they were captured by the camera because they capture a view of real world (naturally causal) in a continuous short time period. For example, the sequence of images in the earlier video (i.e., the video captured before the still image) is the temporal origin of the still image, and the still image is the temporal result of the sequence of images in the earlier video. In other words, the still image is dependent on the images in the earlier video. Also, the images in the later video (i.e., the video captured after the still image) are dependent on the still image and the images in the earlier video.

Moreover, a causal relationship in time also exists among the images in the two videos. For example, two images at different times in the earlier video have a causal relationship when the earlier video was captured. That is, the image captured later in time in the earlier video depends on the image captured earlier in time in the earlier video.

Based on the causality between images in the two videos and the still image when they were captured by the camera, the present disclosure discloses an apparatus and method for tampering detection for digital images by using LTI filtering.

In one embodiment, a LTI filter processes time series data, e.g., the pixel data, representing images in the two videos and the still image of the live photo captured by the camera. If the still image, i.e., the photo, of the live photo is modified, the causality between images in the earlier video and the still image is destroyed. Thus, if the filtered output data representing the still image is non-causal, that is, if the filtered still image is dependent on images in the later video, the non-causal filtered output data representing the still image indicates that the still image has been modified or tampered with after the image was captured.

In another embodiment, a LTI filter processes time series data, e.g., the pixel data, representing images in a video, e.g., the earlier video or the later video. If the filtered output data representing an image in the video is non-causal, that is, if the filtered image frame in the video is dependent on an image frame captured later in time in the video, the non-causal filtered output data representing the image frame indicates that the image frame of the video has been modified or tampered with after the image frame was captured. In other words, the video has been modified.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a computing system 100 according to one embodiment herein. In one embodiment, an image capturing device 110, e.g., a cell phone, camera, or tablet computer, captures the live photo. The image capturing device 110 includes a camera 111 that has a live photo application 112 to capture the live photo. After the user enables the live photo application 112, the camera 111 starts to record video. When the user presses the shutter button of the camera 111 to take a photo, the camera 111 saves, e.g., a 1.5-second video prior to the button press and continues to record and save another 1.5-second video after the button press. So in addition to capturing a still digital image (i.e., a single image), a live photo in this example also includes two 1.5-second videos. In other examples, the two videos captured before and after the still image may be less than, or greater than, 1.5 seconds. In another example, the still image may be a Joint Photographic Experts Group (JPEG) image. In another example, the two videos may be two Graphics Interchange Format (GIF) figures without sound. In another example, the live photo includes the still image and just one video, e.g., the video before the still image or the video after the still image.

After the image capturing device 110 captures the live photo, a third party can obtain the live photo through a variety of ways. For example, the third party can copy the live photo from the user, or the third party can download the live photo if the user posts the live photo on the Internet, e.g., on a personal blog. The third party can modify the live photo in a computing system 120, e.g., a PC, by using an image-manipulating software program. The third party may then send the modified live photo to an organization or news media for publication.

In the embodiments herein, the computing system 100 detects whether a live photo has been modified after it was captured by the image capturing device 110. For example, an organization or news media can use the computing system 100 to detect whether a live photo sent to them by a third party has been modified after it was captured by the device 110.

The computing system 100 includes a processor 101 and a memory 102. The processor 101 may be any computer processor capable of performing the functions described herein. Although memory 102 is shown as a single entity, memory 102 may include one or more memory devices having blocks of memory associated with physical addresses, such as random access memory (RAM), read only memory (ROM), flash memory or other types of volatile and/or non-volatile memory.

The memory 102 includes a LTI filter 103 and a tampering detector 104. In one embodiment, the LTI filter 103 filters time series data, e.g., the pixel data, representing images in one or both of the two videos and/or the still image of the live photo captured by the camera. Images represented by the time series data have a causal relationship in time when they were captured, as explained above.

The tampering detector 104 determines whether the filtered output data is causal by using the LTI filter 103. If the tampering detector 104 determines that the filtered output data representing an image, e.g., the still image or an image frame in one of the two videos, is causal, it asserts a signal indicating that the image has not been modified after it was captured by the camera. On the other hand, if the tampering detector 104 determines that the filtered output data representing the image is non-causal, it asserts a signal indicating that the image has been modified after it was captured. In one embodiment, the LTI filter 103 provides the filtered output data to the tampering detector 104 after it filters the time series data. In another embodiment, after the LTI filter 103 filters the time series data, the filtered output data is stored in the memory 102.

Figure 2:
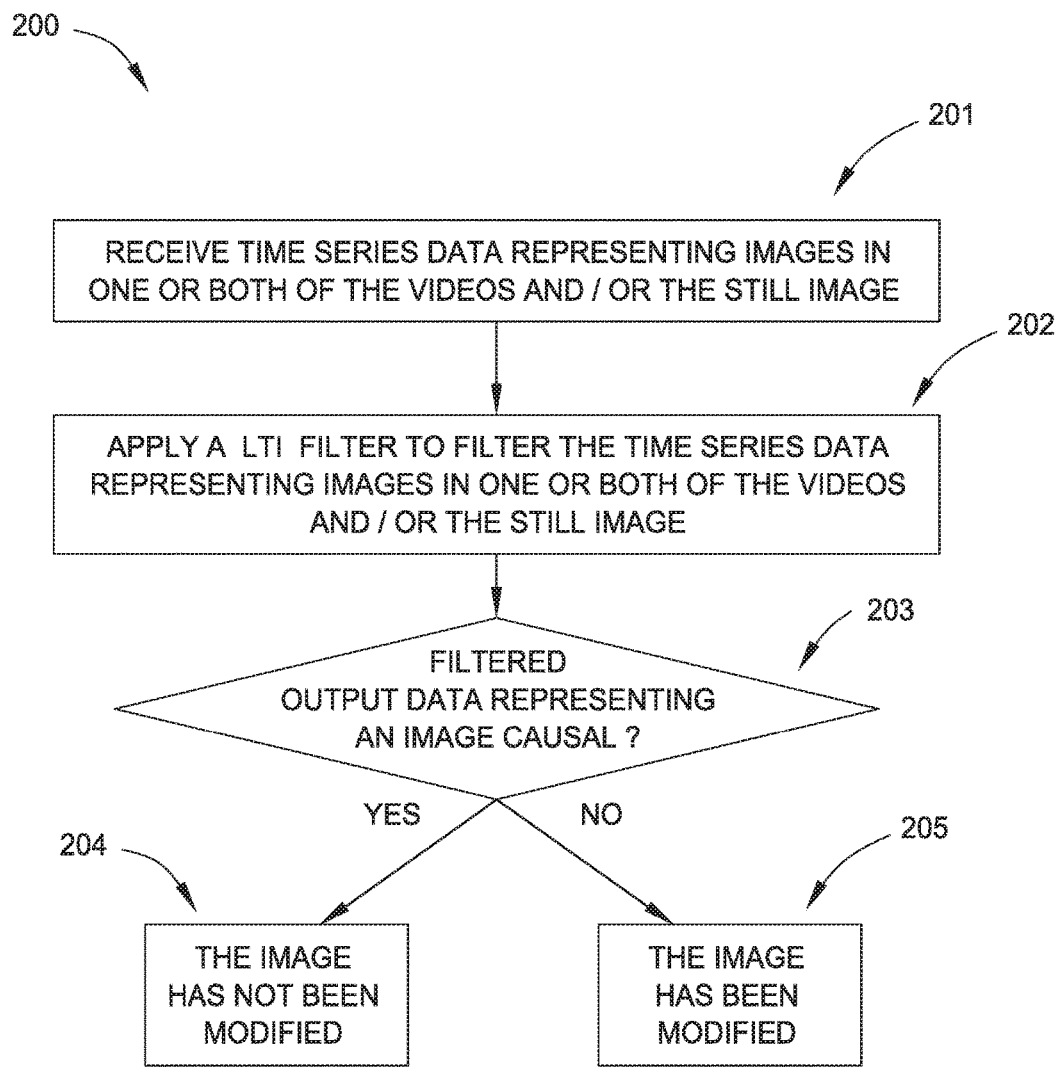
FIG. 2 illustrates a method for tampering detection, according to one embodiment herein.

FIG. 2 illustrates a method 200 to detect whether an image, e.g., the still image or an image frame in one of the two videos, is modified after it was captured, according to one embodiment herein. At block 201, the computing system 100 receives time series data, e.g., the pixel data, representing images in one or both of the two videos and/or the still image of the live photo captured by the camera. In one embodiment, the computing system 100 receives the time series data from a user that imports the data of the live photo into the computing system 100. In this embodiment, when the user imports the data of the live photo into the computing system 100, the user does not know whether the image data of the live photo was modified after the live photo was captured by the camera. In one embodiment, the time series data is stored in the memory 102.

Figure 3:
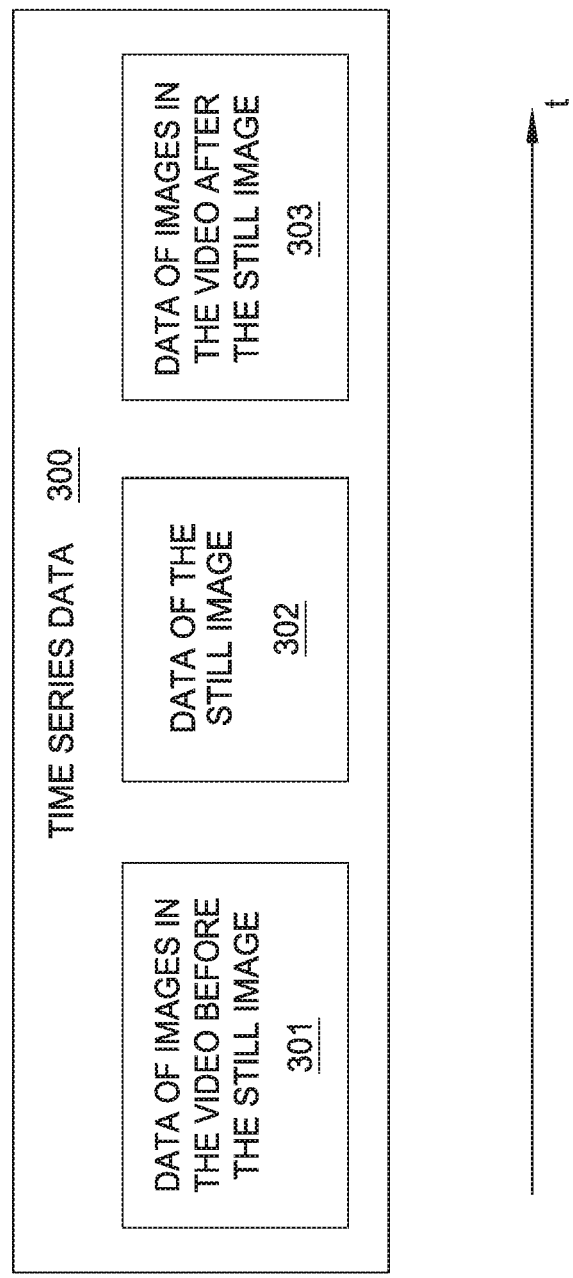
FIG. 3 illustrates a time series data, according to one embodiment herein.

FIG. 3 illustrates a time series data 300, according to one embodiment herein. As shown in FIG. 3, data of images in the earlier video, denoted as block 301, is located as the first portion of the time series data 300 in time order (from left to right as indicated by the arrow). Data of the still image, i.e., the photo, denoted as block 302, is located as the second portion of the time series data 300 in time order. Similarly, data of images in the later video, denoted as block 303, is located as the third portion of the time series data 300 in time order. Thus, in the time series data 300, data of images in the earlier video 301, data of the still image 302 and data of images in the later video 303 have a causal relationship in time if those data are not modified after captured by the camera.

FIG. 3 illustrates only one embodiment of the time series data 300. In another embodiment, the time series data 300 includes the earlier video 301 and the still image 302 (but not the later video) or the still image 302 and the later video 303 (but not the earlier video). In another embodiment, the images are not from a live photo and instead the images are from a single video where the user wants to ensure a frame (or frames) in that video was not modified. Thus, the time series data 300 includes data of the single video.

Based on the time series data 300 in FIG. 3, the computing system 100 can determine whether an image, e.g., the still image or an image frame in one of the two videos, of the live photo is modified after it was captured, based on the time series data. In one embodiment, if the live photo is not modified after it was captured, the time series data includes the original image data of the live photo captured by the camera. Thus the causal relationship in time between images of the live photo is maintained.

On the other hand, if the live photo has been modified after it was captured, there is no causal relationship in time between modified images of the live photo. In one embodiment, if an image of the live photo, e.g., the still image or an image frame in one of the two videos, has been modified after the live photo was captured, there is no causal relationship in time between the modified image and at least one other image of the live photo. In one embodiment, multiple images at multiple time instances of the live photo are modified after the live photo was captured. Modifying one of the images shifts the time order of images in the live photo, e.g., an image captured earlier in time is placed after an image captured later in time so that the time order of the two images is reversed.

In this manner, the computing system 100 can determine whether an image of the live photo is modified after it was captured based on whether the causal relationship in time between images of the live photo is changed.

Returning to method 200, at block 202, in one embodiment, the computing system 100 applies the LTI filter 103 to filter the time series data, e.g., the pixel data, representing one or both of the two videos and/or the still image of the live photo captured by the camera. The LTI filter 103 filters the time series data to generate a series of output filtered data.

Figure 4:
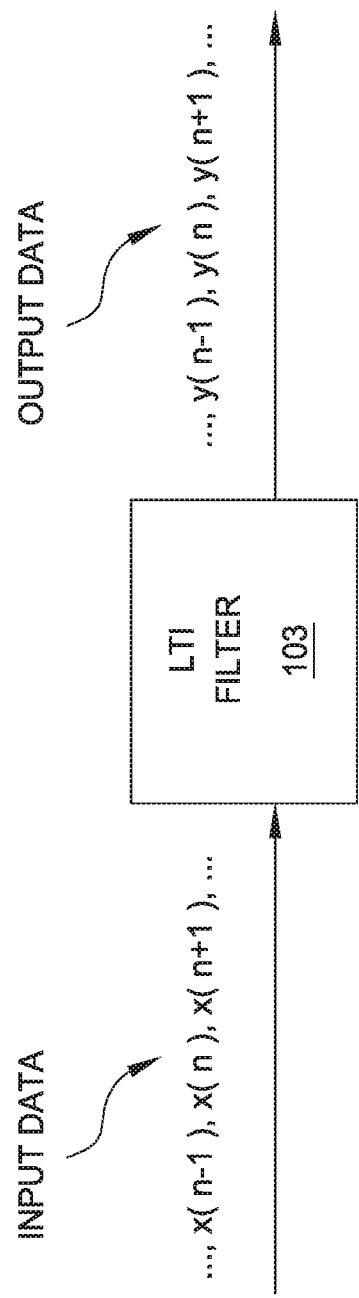
FIG. 4 illustrates original input data and output data to a LTI filter, according to one embodiment herein.

FIG. 4 shows the original, i.e., unmodified, input time series data and the series of output filtered data of the LTI filter 103, according to one embodiment herein. In FIG. 4, the LTI filter 103 filters the time series data representing images in the two videos and the still image of the live photo. In this embodiment, the output filtered data representing the filtered still image is causal, which is described in detail below.

As shown in FIG. 4, the original input time series data includes a series of discrete data in chronological order. For simplicity of illustration, in FIG. 4, the input time series data only shows $x(n-1)$, $x(n)$ and $x(n+1)$. $x(n)$ includes the pixel data, e.g., one or more bits, of an area or portion in the still image, where n denotes the discrete time instance representing the time when the still image was captured. In one embodiment, $x(n)$ includes at least part of the data of block 302 in FIG. 3.

In FIG. 4, $x(n-1)$ includes the pixel data of the same area in an image in the earlier video, where n−1 denotes the discrete time instance representing the time when the image in the earlier video was captured. In one embodiment, $x(n-1)$ includes at least part of the data of block 301 in FIG. 3. $x(n+1)$ represents the pixel data of the same area in an image, e.g., an image frame, in the later video, where n+1 denotes the discrete time instance representing the time when the image in the later video was captured. In one embodiment, $x(n+1)$ includes at least part of the data of block 303 in FIG. 3.

As shown in FIG. 4, in time order (from left to right), $x(n-1)$ is the past input data relative to $X(n)$, i.e., an image frame captured earlier than $x(n)$ in time, and $x(n+1)$ is the future input data relative to $x(n)$, i.e., an image frame captured later than $x(n)$ in time. In one embodiment, the time interval between $x(n-1)$, $x(n)$ and $x(n+1)$ is an equal time interval, e.g., 0.1 seconds.

In FIG. 4, the output filtered data generated by the LTI filter 103 also includes a series of discrete data in time order. For simplicity of illustration, in FIG. 4, the output filtered data only shows $y(n-1)$, $y(n)$ and $y(n+1)$. $y(n)$ is the result of filtering $x(n)$ and represents the filtered still image. $y(n-1)$ is the result of filtering $x(n-1)$ and represents the filtered image in the earlier video. Similarly, $y(n+1)$ is the result of filtering $x(n+1)$ and represents the filtered image in the later video.

Other input time series data at other discrete time instances, e.g., $x(n-2)$ or $x(n+3)$, are also input (not shown in FIG. 4) to the LTI filter 103 in time order, as understood by an ordinary person in the art. For example, $x(n-2)$ includes the pixel data of the same area in another image in the earlier video, where n−2 denotes the discrete time instance representing the time when the image in the earlier video was captured, e.g., two time intervals earlier than n. In another example, $x(n+3)$ includes the pixel data of the same area in an image in the later video, where n+3 denotes the discrete time instance representing the time when the image in the later video was captured, e.g., three time intervals later than n. Similarly, filtered data at other discrete time instances, e.g., $y(n-2)$ or $y(n+3)$, are also output (not shown in FIG. 4) from the LTI filter 103 in time order, as understood by an ordinary person in the art.

In one embedment, the LTI filter 103 is a causal Wiener filter. The causal Wiener filter can filter the input time series data to remove the noise of the input time series data. By applying the Wiener filter to an image, the resulting filtered may have reduced noise than the original images passed into the Wiener filter. When using the causal Wiener filter to filter the input time series data, the output filtered data depends on the input time series data, as understood by an ordinary person in the art.

If after filtering, the output filtered data at a discrete time instance depends only on the input data at the same discrete time instance and/or the input data at past discrete time instances, the output filtered data is causal. In one example, the computing system 100 uses a two-tap causal Wiener filter to filter the input time series data, the output filtered data $y(n)$ is expressed as Equation (1) below:

$$y(n)=h(0)\times x(n)+h(1)\times x(n-1) \qquad (1)$$

where $h(0)$ and $h(1)$ are filtering coefficients of the causal Wiener filter 103. In other words, in this example, the computing system 100 uses a causal Wiener filter with two filtering coefficients h(0) and h(1) to process two consecutive image frames, e.g. x(n) and x(n−1), respectively. In one embodiment, the computing system 100 designs or calculates the filtering coefficients of the causal Wiener filter 103 to remove the noise of the input time series data, as understood by an ordinary person in the art. In this example, the output filtered data y(n), which includes the filtered data of x(n) and represents the filtered still image, only depends on x(n) and the past input data x(n−1), and does not depend on any future input data after time instance n. Thus, the output filtered data y(n) representing the filtered still image is causal. In this example, the time series data input to the causal Wiener filter 103 is the original image data of the live photo. As explained above, if the live photo is not modified after it was captured, the causal relationship in time between images of the live photo is maintained. Thus, after filtering by using the causal Wiener filter 103, the output filtered data y(n) representing the filtered still image is causal.

Figure 5:
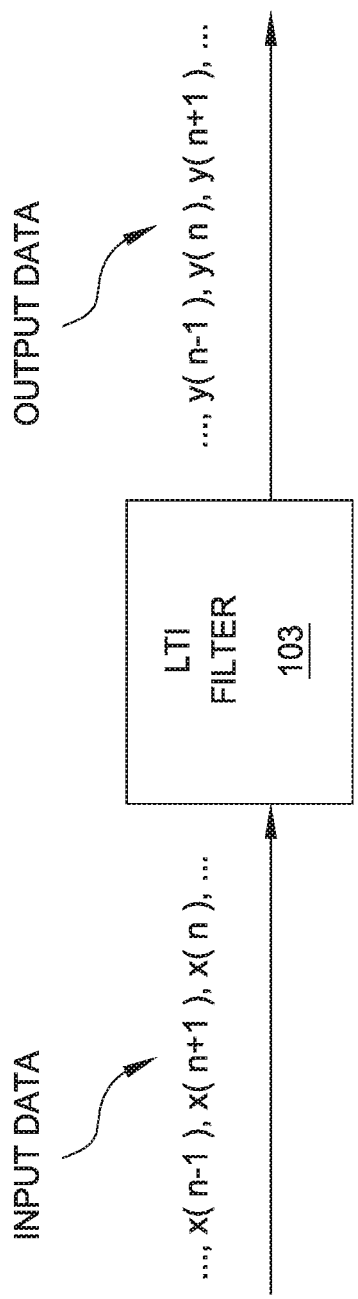
FIG. 5 illustrates modified input data and output data to a LTI filter, according to one embodiment herein.

On the other hand, FIG. 5 shows the modified input time series data and the series of output filtered data of the LTI filter 103, according to one embodiment herein. As shown in FIG. 5, the time order of two image frames x(n) and x(n+1) is shifted, i.e., the time series data input to the causal Wiener filter 103 places x(n+1) before x(n). That is, the time series data input at time instance n is X(n+1) and the time series data input at time instance n+1 is x(n). In other words, the original image frames x(n) and x(n+1) are modified. Thus, the time series data input to the causal Wiener filter 103 is not the original image data of the live photo that has the causal relationship in time. In this embodiment, the output filtered data representing the filtered still image is non-causal, which is described in detail below.

In this example, the computing system 100 still uses the causal Wiener filter 103 with the two filtering coefficients h(0) and h(1) to process two consecutive data frames, respectively, the output filtered data y(n) is expressed as Equation (2) below:

$$y(n)=h(0) \times x(n+1)+h(1) \times x(n-1) \qquad (2)$$

In this example, the output filtered data y(n), which includes the filtered data of modified x(n) and represents the filtered still image at time instance n, depends on the past input data x(n−1) and the future input data x(n+1). Because filtering the input images using the Wiener filter determines that the output filtered data y(n) depends on the future input data x(n+1) after time instance n, the output filtered data y(n) is non-causal. In this example, the time order of two images x(n) and x(n+1) is modified. As explained above, if the live photo has been modified after it was captured, there is no causal relationship in time between modified images of the live photo. Thus, after filtering by using the causal Wiener filter 103, the computer system determines that the output filtered data y(n) representing the filtered still image is non-causal.

The above two examples as shown in FIG. 4 and FIG. 5 are only for explanation purpose. In other embodiments, when using the LTI filter 103 to filter the input time series data, the computing system 100 designs or calculates different filtering coefficients for the causal Wiener filter 103. Accordingly, the output filtered data can be expressed by different equations, as understood by an ordinary person in the art.

FIG. 4 and FIG. 5 show only two embodiments of the input time series data and the series of output filtered data of the LTI filter 103. In another embodiment, the input time series data only includes the pixel data of multiple (at least two) images, e.g., image frames, in the earlier video and/or in the later video. In this embodiment, the series of output filtered data also only includes the filtered data representing the multiple images in the earlier video and/or the later video. In another embodiment, the input time series data only includes the pixel data of at least one image in the earlier video and the pixel data of the still image. In another embodiment, the input time series data only includes the pixel data of the still image and the pixel data of at least one image in the later video. In other embodiments, the contents as well as the time order of the images of the live photo are modified. In other embodiments, the input time series data represents multiple (at least two) images that have a causal relationship in time when they were generated.

When using the LTI filter 103 to filter the input time series data in the above mentioned different embodiments, the output filtered data of an image, e.g., the still image or an image in one of the two videos, can be expressed by the same equations as above or different equations, as understood by an ordinary person in the art.

After the filtering, the output filtered data is stored in the memory 102. At block 203, the detector 204 analyzes the output filtered data and determines whether the output filtered data is causal or non-causal. If the detector 204 detects that the output filtered data representing an image only depends on the input data of the image and/or past input data before the image in time order, the detector 204 determines that the output filtered data representing the image is causal. On the other hand, if the detector 204 detects that the output filtered data representing the image depends on image data that was captured after the image was captured, the detector 204 determines that the output filtered data representing the image is non-causal.

If the detector 204 determines that the output filtered data representing the image is causal, the method 200 proceeds to block 204, where the detector 204 determines that data of the image has not been modified after it was captured by the camera. In one embodiment, the detector 204 asserts a signal indicating that the image has not been modified after it was captured by the camera.

On the other hand, if the detector 204 determines that the output filtered data representing the image is non-causal, the method 200 proceeds to block 205, where the detector 204 determines that data of the image has been modified after it was captured by the camera. In one embodiment, the detector 204 asserts a signal indicating that the image has been modified or tampered with after it was captured by the camera.

In one embodiment, the computing system 100 detects whether data of a visible content of an image is modified, such as a person or a building in the image. In another embodiment, the computing system 100 detects whether data of an invisible content of an image is modified, such as a timestamp embedded in the image or the videos.

In one embodiment, the computing system 100 generates a plot reflecting the causality of the filtered output data. For example, the computing system 100 generates a plot describing the filtered output data as a function of time. If the filtered output data is causal, the plot shows a steady trend of the filtered output data as a function of time. However, if the filtered output data is non-causal for a period of time, the plot shows a non-steady change of the filtered output data during that period, as understood in the art.

The computing system 100 is not limited to determining if a live photo was modified. In other embodiments, the computing system 100 is used to detect tampering for any series of digital images that have a causal relationship in time when they are generated.

While the foregoing is directed to embodiments of the present invention, other and further embodiments of the invention may be devised without departing from the basic scope thereof, and the scope thereof is determined by the claims that follow.

What is claimed is:

1. A system, comprising:
   a processor; and
   a memory containing a program that, when executed on the processor, performs an operation, the operation comprising:
   filtering time series data using a linear time-invariant digital filter, wherein the time series data represents at least one first image, a second image, and a third image, and wherein the at least one first image was captured by a camera before the second image was captured, and wherein the third image was captured by the camera after the second image was captured, and wherein a causal relationship in time existed between the at least one first image and the second image when the first and second images were captured, and wherein the causal relationship in time existed among the second image and the third image when the second and third images were captured; and
   upon determining that output data representing the second image generated by the linear time-invariant digital filter is non-causal in that the output data representing the second image depends upon the third image, asserting a signal indicating that the second image has been modified after the second image was captured by the camera.

2. The system of claim 1, wherein the linear time-invariant digital filter comprises a causal Wiener Filter.

3. The system of claim 1, wherein the second image comprises a still image, and wherein the at least one first image comprises at least one image frame in a video.

4. The system of claim 1, wherein the at least one first image and the second image comprise image frames in at least one video.

5. The system of claim 1, wherein the time series data represents a same area of the second image captured by the camera at different times.

6. The system of claim 3 wherein the third image comprises at least one image frame in another video.

7. The system of claim 1, wherein the at least one first image, the second image, and the third image comprise frames in at least one video.

8. A computer program product, comprising:
   a non-transitory computer-readable storage medium having computer readable program code embodied therewith, the computer readable program code comprising:
   computer readable program code configured to filter time series data using a linear time-invariant digital filter, wherein the time series data represents at least one first image, a second image captured by a camera, and a one third image, and wherein the at least one first image was captured by the camera before the second image was captured, and wherein the third image was captured by the camera after the second image was captured, and wherein a causal relationship in time existed between the at least one first image and the second image when the first and second images were captured, and wherein the causal relationship in time existed among the second image and the third image when the second and third images were captured; and
   computer readable program code configured to, upon determining that output data representing the second image generated by the linear time-invariant digital filter is non-causal in that the output data representing the second image depends upon the third image, asserting a signal indicating that the second image has been modified after the image was captured by the camera.

9. The computer program product of claim 8, wherein the linear time-invariant digital filter comprises a causal Wiener Filter.

10. The computer program product of claim 8, wherein the second image comprises a still image, and wherein the at least one first image comprises at least one image frame in a video.

11. The computer program product of claim 8, wherein the at least one first image and the second image comprise image frames in at least one video.

12. The computer program product of claim 8, wherein the time series data represents a same area of the second image captured by the camera at different times.

13. The computer program product of claim 10, wherein the third image comprises at least one image frame in another video.

14. The computer program product of claim 8, wherein the at least one first image, the second image, and the third image comprise frames in at least one video.

15. A method, comprising,
   filtering time series data using a linear time-invariant digital filter, wherein the time series data represents at least one first image, a second image, a third image captured by a camera, and wherein the at least one first image was captured by the camera before the second image was captured, and wherein the third image was captured by the camera after the second image was captured, and wherein a causal relationship in time existed between the at least one first image and the second image when the first and second images were captured, and wherein the causal relationship in time existed among the second image and the third image when the second and third images were captured; and
   upon determining that output data representing the second image generated by the linear time-invariant digital filter is non-causal in that the output data representing the second image depends upon the third image, asserting a signal indicating that the second image has been modified after the image was captured by the camera.

16. The method of claim 15, wherein the linear time-invariant digital filter comprises a causal Wiener Filter.

17. The method of claim 15, wherein the second image comprises a still image, and wherein the at least one first image comprises at least one image frame in a video.

18. The method of claim 15, wherein the at least one first image and the second image comprise image frames in at least one video.

19. The method of claim 15, wherein the time series data represents a same area of the second image captured by the camera at different times.

20. The method of claim 17, wherein the third image comprises at least one image frame in another video.

* * * * *